Aug. 14, 1945.　　　L. BROZEK　　　2,382,947

SECURING MEANS

Filed July 27, 1944

Inventor
Lawrence Brozek,
By
Attorney

Patented Aug. 14, 1945

2,382,947

UNITED STATES PATENT OFFICE 2,382,947

SECURING MEANS

Lawrence Brozek, Jackson Heights, N. Y., assignor to Waldes Koh-I-Noor, Inc., Long Island City, N. Y., a corporation of New York Application July 27, 1944, Serial No. 546,865

8 Claims. (Cl. 85—8.5)

This invention relates to improvements in securing means and, in its more specific aspects, to open-ended resilient retaining rings which are sprung into the groove of a shaft or housing, for example, to secure machine parts, such as ball bearings, roller bearings, gears, and the like, against axial displacement on the shaft or in the housing.

As heretofore known, such rings are of two distinct types. According to one known type, the ring is formed with uniform section height throughout its circumference and has inner diameter in the case of an external ring, or outer diameter in the case of an internal ring, which corresponds approximately to that of the base of the groove in which the ring seats, so that such rings fit tight against the bottom of their seating grooves throughout their peripheries but without any substantial pressure thereagainst. The depth of the groove in which rings constructed as aforesaid can be sprung must be moderate because, in seating, such rings are required to be spread in order to be slipped over the shaft or compressed when inserted into the housing and this leads to an oval deformation of a ring having uniform section height, and hence to a relatively high degree of spreading and compressing and moreover to relatively high working stresses on the mid section of the ring which is subjected to the greatest stress.

According to the second known type of spring retaining rings, i. e., the ring is so tapered that the section heights thereof decrease progressively from its mid section to its free ends, the taper being calculated so that the ring maintains its circularity under deformation. Accordingly, the amount of spreading or compressing required to spring a tapered ring over a shaft or into a housing is relatively small compared with rings of the first described type. Furthermore, tapered rings can be so dimensioned that they fit tight all around and with relatively high pressure against the bottoms of the grooves in which they seat, a feature of recognized advantage which has led to the wide use of the tapered ring.

The object of the present invention, stated broadly, is to improve the first type of ring, namely, the ring which fits tight against the bottom of its groove but without any substantial pressure. More specifically, the invention aims to provide an open-ended resilient retaining ring of the type having an effective diameter, either inner or outer, which corresponds substantially to the base or bottom diameter of its seating groove, but which can be spread or compressed to a substantially greater degree without undue stressing of the mid section thereof, and which can accordingly be sprung into a shaft or housing groove of substantially greater depth, than is possible with known rings of uniform section height throughout as are limited to use in grooves of moderate depth. The invention also contemplates a retaining ring which may be self-balanced for high speed rotation in simple and effective manner and which moreover can be provided with holes or equivalent means for receiving handling tools without the requirement of specially designed ears or lugs, as is the case particularly with known retaining rings of the tapered type.

The desirable objectives aforesaid, as well as others not specifically outlined herein, are achieved according to the invention by the provision of an open-ended resilient retaining ring having inner diameter in the case of an external ring, or outer diameter in the case of an internal ring, which corresponds substantially to the base diameter of its seating groove, but which differs from the prior rings having uniform section height throughout the circumference thereof, or being characterized by a decreasing section height from mid section to free ends, in that its inner and outer circular edges are eccentrically arranged to each other in such manner that the section heights of the ring increase uniformly (taper) from its mid section to its free ends. Thus, in a ring according to the invention, the eccentricity of its defining edges can be so chosen that the ring is capable of being expanded or compressed, without undue stressing of its mid section, to a substantially greater degree than is possible with rings of uniform section height throughout. Moreover, a ring having progressively increasing section height from mid section to free end sections, as aforesaid, may be simply and effectively balanced by a choice of eccentricity between inner and outer edges providing the necessary ring area as to compensate for the open slot or gap between the ends of the ring, which mainly causes the unbalance of open-ended rings when rotated at high speeds. It will be observed also that the free ends of a tapered ring, which, according to the invention, have maximum section height, themselves provide adequate area for holes or similar means usually provided for the reception of the points of pliers or like tools by which the ring is handled, and accordingly the instant ring may be formed without specially formed ears or lugs usually provided on the known retaining rings to assist in handling the same.

In the drawing, illustrating the improved ring construction and the manner of use thereof—

Figure 1:
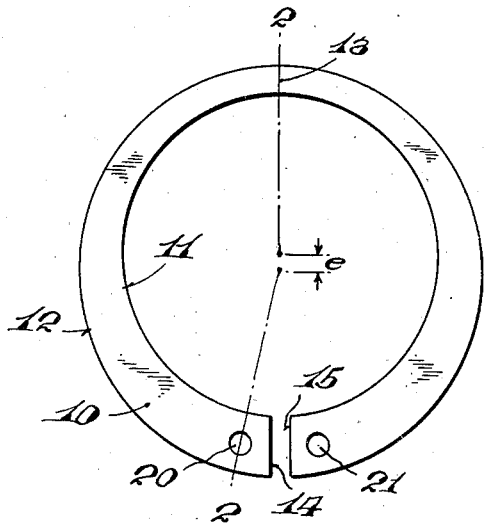
Fig. 1 is a plan view of an external spring ring according to the invention.
Figure 2:
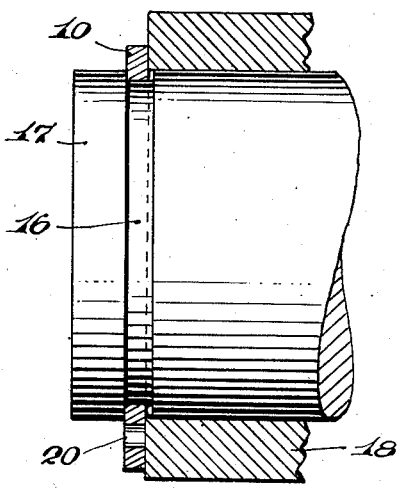
Fig. 2 is a view illustrating the external ring shown in Fig. 1 sprung into a shaft groove so as to secure a machine part against axial displacement on the shaft, the ring being sectioned along a line corresponding to line 2—2 of Fig. 1.

As seen in Fig. 1, the ring 10 is preferably stamped from sheet metal and is defined by circular edges 11 and 12, respectively, which are eccentrically arranged to each other so that the section height of the ring progressively increases or tapers from its mid section 13 to the free ends 14, 15 thereof. Such eccentricity is provided by striking the aforesaid edges from centers having eccentricity e, which is so chosen that the ring can be expanded or contracted by a substantial amount without undue stressing of its mid section 13. An external ring as aforesaid is adapted to be sprung into a shaft groove such as the groove 16 (Fig. 2) provided in a shaft 17 and when seated in its groove functions to secure a machine part designated 18, which may be a ball or roller bearing, a gear or the like, against axial displacement on the shaft. Preferably, the inner circular edge 11 of the ring has diameter corresponding to the base diameter of the groove 16, so that the seated ring while fitting tight all around does not exert any substantial pressure against the groove bottom or base.

It will be seen from Fig. 1 that the free ends of the ring 10 have maximum section height and hence provide ample space for holes 20, 21, provided for the reception of the points of pliers or like tools by which the ring can be handled. Accordingly, in a ring according to the invention, there is no requirement of forming at the ends thereof specially formed ears or lugs which characterize the tapered retaining rings of prior construction. It will be observed, also, that due to the open-ended construction of the ring a gap or slot is left between the open ends 14, 15 of width such that unbalance of the ring may result in high speed rotation thereof. However, in a ring according to the invention, the eccentricity of the ring edges can be so chosen that adequate ring area is provided at the open ends so as to compensate for the gap or slot, and hence the aforesaid ring can be simply and effectively self-balanced.

Figure 3:
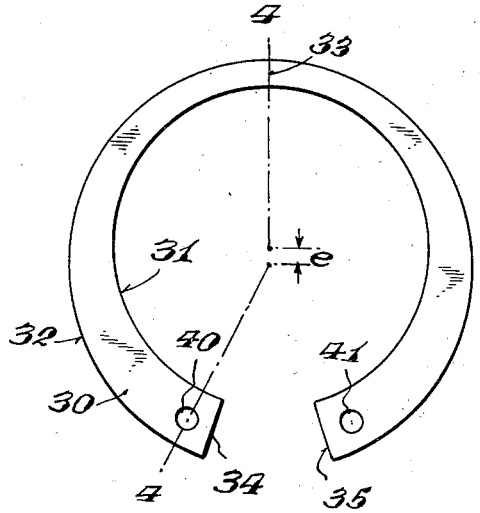
Fig. 3 is a plan view of an internal ring according to the invention.
Figure 4:
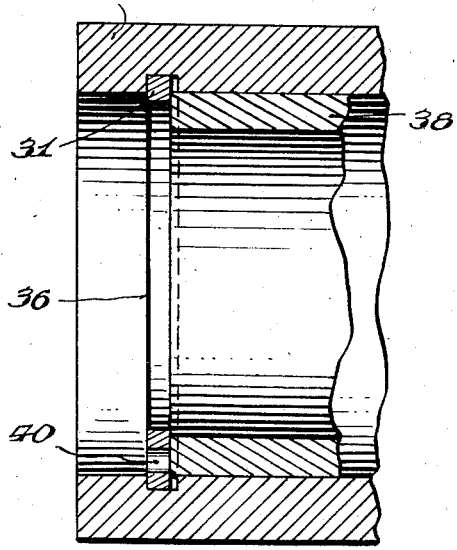
Fig. 4 is a view illustrating the internal ring shown in Fig. 3 seated in its housing groove, the ring being sectioned along a line corresponding to line 4—4 of Fig. 3.

Fig. 3 illustrates a ring of similar construction but of the so-called internal type which is compressed in order to be sprung into a housing or bore groove in which it operates. According to the Fig. 3 modification, the ring 30 is provided with an inner edge 31 and an outer edge 32, said edges being eccentric, and their eccentricity e being so chosen that the section heights of the ring progressively increase from the mid section 33 to the free ends 34, 35 thereof. The diameter of the outer circular edge 32 thereof corresponds approximately to the base diameter of the groove 36 (Fig. 4) provided in a housing 37. When seated in the manner illustrated in Fig. 4, the ring fits tight against the base of the groove 36 but without substantial pressure and functions to secure a machine part 38 against axial displacement within the housing. The internal ring of Fig. 3 is provided at its ends with holes or equivalent means 40, 41, similar to the holes 20, 21 of the Fig. 1 ring, and serving a similar purpose.

In addition to providing the advantage that a ring tapering progressively from its mid section to its free ends may be spread or compressed to a greater amount as compared with a ring of uniform section height throughout, and thus that the ring can be more readily slipped into its groove in a shaft or housing, rings according to the invention may also be applied to grooves of greater depth as compared with the grooves of moderate depth to which the rings of uniform section height must be applied. This is a feature of practical importance because such rings are to a large extent manufactured of high-grade spring steel and are usually applied on shafts or in housings constructed of metal of lesser strength, for example, on shafts of cold-rolled steel, or in housings of aluminum alloys, for example. Hence, with rings according to the invention being capable of use with deeper shaft or housing grooves, the allowable thrust load which they will hold is increased in proportion.

The aforesaid ring construction also permits of simple and inexpensive manufacture because with the free ends of the ring having maximum section height, adequate area is provided in the end portions thereof, both to balance for the slot left between the ring ends and also for holes or the like, without the necessity of additional lugs or ears usually provided in the known rings for the reception of such holes and/or to effect balancing thereof.

As many changes could be made in carrying out the above constructions without departing from the scope of the invention, it is intended that all matter contained in the above description or shown in the accompanying drawing shall be interpreted as illustrative and not in a limiting sense.

I claim:

1. Securing means comprising an open-ended spring ring having outer and inner circular edges which are eccentrically arranged to each other in such manner that the section heights increase uniformly from the mid section to the free ends thereof.

2. Securing means comprising an open-ended spring ring having outer and inner circular edges which are eccentrically arranged to each other in such manner that the section heights increase uniformly from the mid section to the free ends thereof, the free ends of the rings of maximum section height being provided with means whereby the ring may be handled by a suitable tool.

3. Securing means comprising an open-ended spring ring having outer and inner circular edges which are eccentrically arranged to each other in such manner that the section heights increase uniformly from the mid section to the free ends thereof, the free ends of the ring of maximum section height being provided with holes for the reception of the points of pliers or like handling tools.

4. Securing means comprising an open-ended spring ring having outer and inner circular edges which are eccentrically arranged to each other in such manner that the section heights increase uniformly from the mid section to the free ends thereof, the eccentricity of said edges being chosen so as to provide ring area which compensates for the slot between the open ends of the ring whereby the latter is self-balanced in rotation.

5. Securing means comprising an open-ended spring ring adapted to be sprung into the groove of a shaft or the like, the section heights of the ring increasing uniformly from its mid section to its open ends, the inner diameter of the ring corresponding substantially to that of the base of the groove.

6. Securing means comprising an open-ended spring ring adapted to be sprung into the groove of a shaft or the like, the ring having outer and inner circular edges which are eccentrically arranged to each other in such manner that the section heights increase uniformly from the mid section to the free ends thereof, the inner diameter of the ring corresponding substantially to that of the base of the shaft groove.

7. Securing means comprising an open-ended spring ring adapted to be sprung into the groove of a housing or the like, the section heights of the ring increasing uniformly from its mid section to its open ends, the outer diameter of the ring corresponding substantially to that of the base of the housing groove.

8. Securing means comprising an open-ended spring ring adapted to be sprung into the groove of a housing or the like, the ring having outer and inner circular edges which are eccentrically arranged to each other in such manner that the section heights increase uniformly from the mid section to the free ends thereof, the diameter of the outer circular edge corresponding substantially to the diameter of the base of the housing groove.

LAWRENCE BROZEK.